United States Patent Office 2,790,496
Patented Apr. 30, 1957

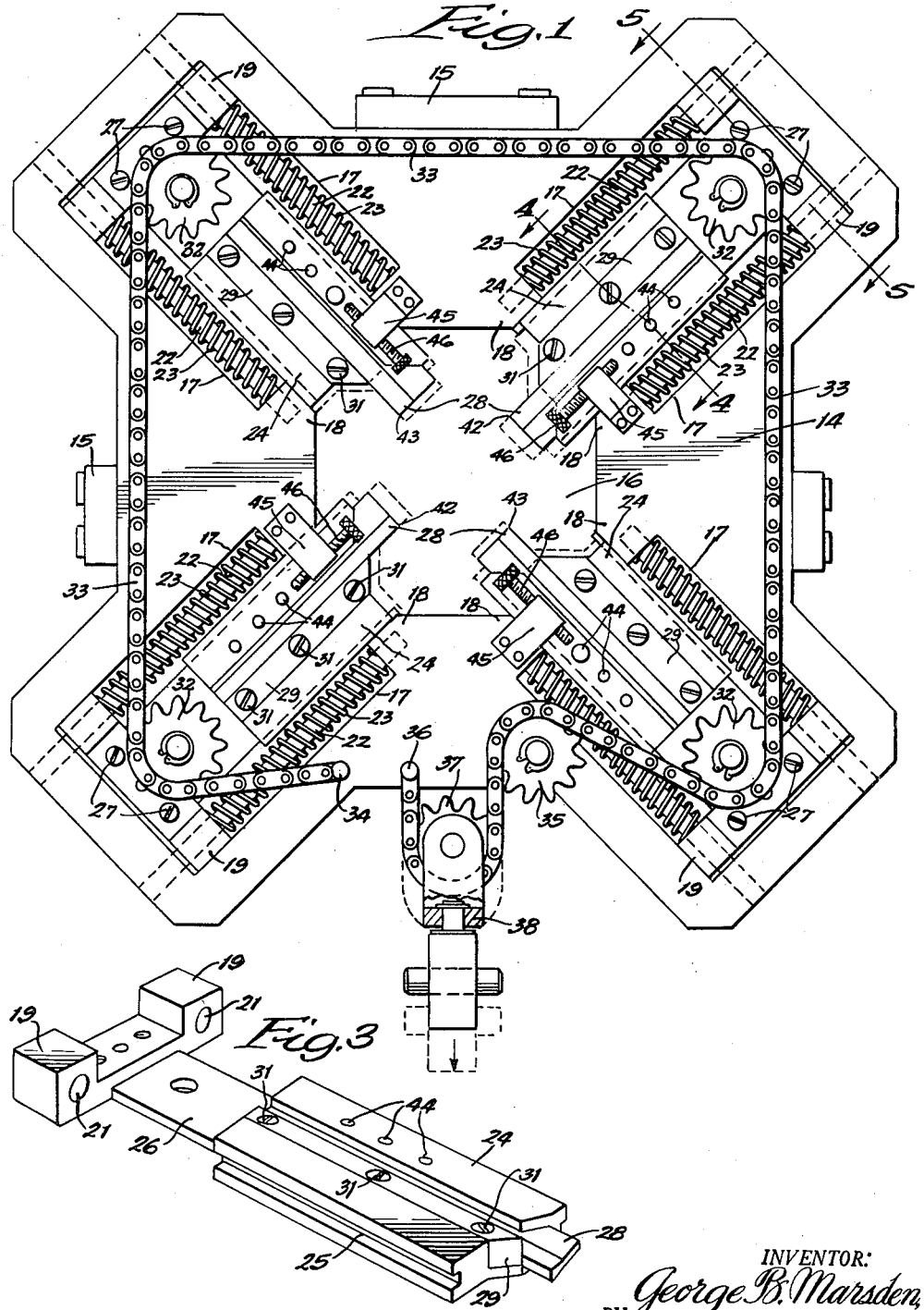

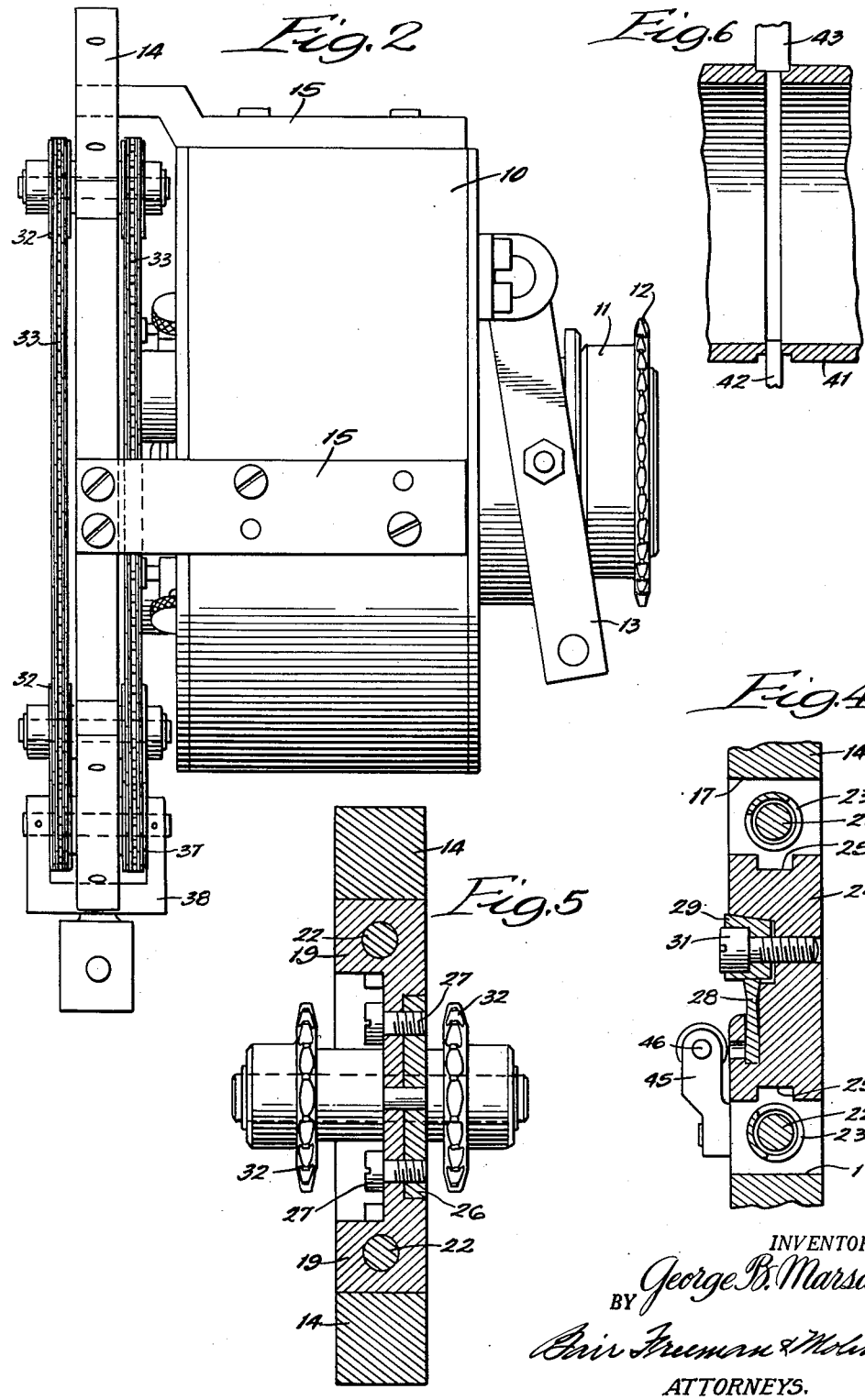

2,790,496
PIPE CUT OFF

George B. Marsden, Cicero, Ill., assignor to Chicago Nipple Manufacturing Company, a corporation of Delaware Application April 5, 1954, Serial No. 420,923

3 Claims. (Cl. 164—60)

This invention relates to a pipe cut off and while it is more particularly described in connection with an apparatus for cutting lengths from a pipe, it is equally applicable to cut off tubes, rods, or the like, or to the performance of other analogous machining operations, such as grooving.

It has heretofore been the practice in cutting off pipe to rotate the pipe by a driving wheel or belt and to press a rotary cut off wheel against the pipe to cut it. The apparatus required for this operation is relatively bulky and slow and requires a great deal of hand labor. Furthermore the cut off wheel throws up a bead on the cut end of the pipe which is objectionable for many uses.

It is one of the objects of the present invention to provide a pipe cut off which is extremely compact and rapid in operation and in which any desired type of cut can be obtained.

Another object is to provide a pipe cut off in which a plurality of cut off or shaping tools act on the pipe simultaneously and are pressed against it with equal force so that the pipe is cut rapidly and uniformly and tool wear is uniform.

According to one feature of the invention one or more of the tools may be stopped at a point of cut off to perform chamfering, shouldering operations, or the like.

A further object is to provide a pipe cut off in which the tools are resiliently urged outwardly and are simultaneously moved inwardly by flexible tension elements looped around rollers on the tools to move them simultaneously with equal force.

A still further object is to provide a pipe cut off in which the cut off mechanism is carried by a frame or body adjacent to one end of a rotatable chuck to produce a compact and efficient unit.

The above and other objects and features of the invention will be more readily apparent from the following description when read in connection with the accompanying drawings, in which:

Figure 1 is a front elevation of a pipe cut off embodying the invention;

Figure 2 is a side elevation showing a complete chuck and cut off assembly;

Figure 3 is a partial perspective view of a cutter block;

Figure 4 is a section of the cutter block on the line 4—4 of Figure 1;

Figure 5 is a similar section on the line 5—5 of Figure 1; and

Figure 6 is a partial section through a pipe illustrating operation of cut off and shouldering tools.

The cut off of the present invention is adapted to be used in conjunction with a chuck which will grip and rotate a pipe and which may be constructed as more particularly described and claimed in my co-pending application, Serial No. 53,287 now abandoned. As shown in Figure 2, the chuck is supported in a cylindrical frame or body 10 and has a hollow hub 11 through which a pipe to be cut off may be passed. The chuck may be turned through a sprocket wheel 12 on the hub 11 and may be controlled to grip or release the pipe by a control lever 13. In the complete assembly, the frame or body 10 is held stationary and the chuck rotates within it to turn the pipe.

The cut off comprises a supporting body 14 in the form of a generally flat plate which is rigidly secured to the chuck body 10 by brackets 15. The plate or body 14 is formed, as best seen in Figure 1, with a central opening 16 through which the pipe may pass and with a series of guide slots 17 extending radially in the body around the central opening. As shown, four guide slots are provided although a greater or less number could be employed, as desired. Each guide slot terminates adjacent the opening in inwardly extending shoulders 18 formed with tongues to guide the cutter blocks, as described hereinafter and is wider radially outward from the tongue 18 for mounting of the cutter blocks.

Each guide slot is adapted to receive a cutter block unit, as shown in Figure 3, which comprises an outer enlarged head 19 of a size to fit in the wide portion of the slot and which is formed with guide openings 21 therein. The guide openings 21 slidably fit over guide rods 22 mounted in the wide portion of the guide slot and compression springs 23 threaded around the guide rods engage the head 19 to urge it radially outward. The head can easily be assembled laterally into the guide slot and the guide rods 22 can then be inserted from the periphery of the body 14 to hold the head slidably in the slot. The cutter block is completed by a main block portion 24 of a width equal to the spacing between the fingers 18 and which is grooved in its sides, as indicated at 25, to fit slidably over the guide projections on the fingers 18. The block 24 terminates at one end in a narrow tongue 26 which fits into a groove in the bottom of the head 19, as best seen in Figure 5. The tongue may be secured to the head by screws 27 or the like to hold the parts assembled and which can be removed to permit easy removal of the main block 24 by sliding it radially inward when desired.

The main block 24 is formed in its upper surface with a recess to receive an elongated cutting tool 28, as best shown in Figure 4. The tool can slip laterally of the block 24 into the recess and may be held therein by a wedge strip 29 which is secured to the block by screws 31. When the tool 28 is placed in the groove, as shown, and the block 29 is drawn up tightly, the tool will be securely held, but can easily be removed by removing wedge 29 for sharpening or replacement. Normally the end of the tool projects beyond the end of the block, as shown in Figures 1 and 3, a distance at least equal to the depth of cut desired so that the tool will be rigidly supported, but can effect the cutting operation without the block engaging and interfering with the work.

The several cutting blocks are adapted to be moved radially inward simultaneously to effect a cutting operation on a pipe or similar workpiece gripped and rotated by the chuck. For this purpose, each cutting block carries a pair of sprocket rollers 32 lying on opposite sides thereof and which may be secured to the tongue portion 26 of the block. The sprocket rollers 32 are freely rotatable and are engaged by a pair of sprocket chains 33 lying on opposite sides of the frame or body 14 and threaded over all of the rollers on the block. As best seen in Figure 1, one end of the sprocket chain may be anchored to the body 14 at 34 and the chain may then pass in sequence over rollers 32 about the several blocks and over a guide roller or sprocket 35 on the frame or body 14. The opposite end of the chain is secured to the frame 14 at 36.

To vary the tension in the chains and thereby move the cutter blocks inward, the chains are engaged between the guide roller 35 and the anchor point 36 by sprocket rollers 37 carried by a yoke 38, which is adapted to be moved radially toward and away from the frame or body 14 through any suitable operating mechanism, not shown. When the yoke 38 is moved away from the body 14, the chain will be shortened to move all of the cutter blocks radially inward against their springs 23 simultaneously. The force exerted at each of the cutter blocks will be equalized through the chains so that all of the cutters will exert an equal pressure on the work to maintain uniform cutting action and uniform wear of the tools. The use of two chains passing over sprocket rollers on opposite sides of the cutter blocks eliminates tilting forces on the blocks which might tend to produce binding. Therefor the cutter blocks will all move uniformly and freely as the chain is tensioned and will be returned to their radial outer positions by the springs 23 when the tension on the chains is relaxed.

In operation of the mechanism, as so far described, a workpiece may be passed through the hub of the chuck and through the opening 16 to the desired distance, as determined by gauges, or the like. When the chuck is rotated it will grip and turn the workpiece and the cutter blocks may then be moved radially inwardly to bring the cutters against the workpiece to effect a cut off or other machining operation. As the cutter blocks move inward, the projecting cutters therein will engage the workpiece and will be pressed against it with uniform force so that each cutter will effect the same degree of cut as the other cutters to increase the rapidity of the operation and to equalize wear. When the cutter blocks have been moved in sufficiently to cut off the pipe, or to complete any other desired machining operation, the yoke 38 may be moved toward the body to relax the tension on the chains 33 so that the cutter blocks will move radially outward and the cutters will clear the workpiece. At this time the chuck may be released and the workpiece may be advanced through the chuck hub and the opening 16 for a subsequent operation.

In many instances it may be desirable to utilize different types of tools in the different cutter blocks simultaneously to effect different types of operations. For example, in cutting off pipe it may be desirable to utilize one or more of the tools as a chamfering or shouldering tool while the remaining tools function as cut off tools. As illustrated in Figure 6, for example, a pipe 41 is to be cut off and to be left with a shouldered end. For this purpose, all of the tools except one may be conventional cut off tools, as shown at 42, which will be moved inward a sufficient distance to pass completely through the pipe wall and effect a cut off. The remaining tool, as shown at 43, may be wider and may have its radial inward movement limited to a point such that it will pass only partly through the wall to leave a shoulder at the cut off end.

To limit inward movement of a tool such as 43 stops are provided, as shown in Figure 1, which can be utilized to stop the inward movement of any one or more of the cutter blocks at a desired radial position. For this purpose each cutter block is formed with a plurality of openings 44 therein to receive stop pins which may be inserted and removed, as desired. At the inner end of each groove, a bracket 45 is mounted on the body 14 and carries an adjustable stop screw 46 in radial alignment with the openings 44. To stop movement of one of the cutter blocks a stop pin may be inserted in the desired one of the openings 44 therein and the stop screw 46 may be adjusted to engage the pin and limit inward movement of the cutter block at a selected point. Due to the fact that all of the blocks are moved through the claims 33 any one of the blocks may be stopped at any desired point without limiting in any way the movement of the other cutter blocks so that a full cut off or other machining operation is insured.

It will be seen that with the present invention workpieces of widely varying sizes can be handled without requiring any adjustment of the mechanism or changes of any parts. For example, pipes from a relatively small size up to several inches in diameter can be cut off without requiring any change of tools or other adjustment of the mechanism other than possibly an adjustment of the degree of movement of the yoke 38. The cut off of the present invention is therefore very flexible and will function to cut off or otherwise machine pipes such as workpieces very rapidly and efficiently.

While one embodiment of the invention has been shown and described, it will be understood that this is illustrative only and is not to be taken as a definition of the scope of the invention, reference being had for this purpose to the appended claims.

What is claimed is:

1. A pipe cut off comprising a body having an opening in its center through which a pipe is adapted to extend, a plurality of cutters mounted on the body for radial movement toward and away from the center of the body, resilient means urging the cutters radially outward, operating means simultaneously urging the cutters radially inward with equal pressure on the cutters, and individual adjustable stop means for the cutters to individually limit inward movement thereof.

2. A pipe cut off comprising a body having an opening in its center through which a pipe may extend and having a plurality of radially extending ways around the opening, a cutter block slidable in each of the ways, a cutter blade carried by each block and movable radially into the opening to act on a pipe extending therethrough, means resiliently urging the blocks outward, rollers carried by the blocks, a flexible tension element extending around all of the rollers, means to increase the tension on the tension element to move the blocks radially inward simultaneously with equal force, and adjustable stops on the body engageable with the blocks respectively selectively to limit inward movement of the blocks.

3. A pipe cut off comprising a body, a chuck rotatably carried by the body having a central opening therethrough to receive a pipe, a plurality of radially extending ways in the body adjacent to one end of the chuck, a cutter block slidable in each of the ways, a cutter blade carried by each block to engage and cut a pipe gripped and rotated by the chuck, resilient means to urge the blocks radially outward, a flexible tension engaging each of the blocks, means to increase the tension on the tension element thereby to move the blocks inward simultaneously with equal force, and stops on the body engageable with the blocks respectively selectively to limit inward movement of the blocks.

References Cited in the file of this patent
UNITED STATES PATENTS

| | | |
|---|---|---|
| 842,603 | Zidovec | Jan. 29, 1907 |
| 849,147 | Lewis | Apr. 2, 1907 |
| 1,372,127 | Faunce | Mar. 22, 1921 |
| 1,595,909 | Millsom | Aug. 10, 1926 |
| 2,291,395 | Levey | July 28, 1942 |